N. GERSON.
HANDLE BAR GRIP.
APPLICATION FILED AUG. 3, 1920.

1,409,142.

Patented Mar. 7, 1922.

Inventor—
Nikolaus Gerson
by his Attorneys.
Howson & Howson

UNITED STATES PATENT OFFICE.

NIKOLAUS GERSON, OF PHILADELPHIA, PENNSYLVANIA, ASSIGNOR TO A. MECKY COMPANY, OF PHILADELPHIA, PENNSYLVANIA, A CORPORATION OF PENNSYLVANIA.

HANDLE-BAR GRIP.

1,409,142.

Specification of Letters Patent.

Patented Mar. 7, 1922.

Application filed August 3, 1920. Serial No. 401,028.

*To all whom it may concern:*

Be it known that I, NIKOLAUS GERSON, a citizen of the United States, residing in Philadelphia, Pennsylvania, have invented Handle-Bar Grips, of which the following is a specification.

One object of this invention is to provide novel means of attaching the hand holds or grips to the handle bars of children's vehicles, such as velocipedes, bicycles, or the like, whereby said grips shall be maintained firmly and immovably in position.

It is further desired to provide a relatively simple, inexpensive and commercially practical device for non-rotatably holding a hand grip or handle to a bar, the invention contemplating such a construction of parts that the same means which prevents relative rotation of the hand grip shall likewise effectually prevent its movement longitudinally of the bar on which it is mounted.

Figure 1:
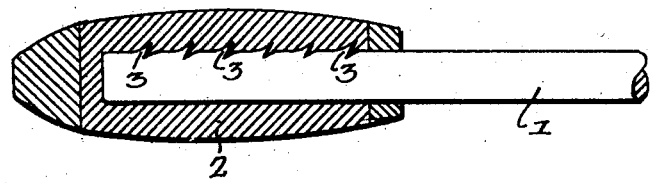
Figure 2:
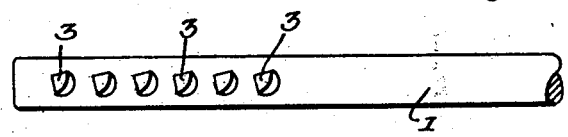

These objects and other advantageous ends I attain as hereinafter set forth, reference being had to the accompanying drawings, in which, Fig. 1 is a longitudinal vertical section illustrating my invention as applied to the handle bar of a velocipede or bicycle;

Fig. 2 is a plan of that end of the handle bar shown in Fig. 1.

In the above drawings 1 represents one end of a rod constituting the handle bar of a bicycle, velocipede, or other children's vehicle, to which is applied a hand hold or grip 2 which may be made of leather, wood, cork, or other suitable and relatively soft material in any desired form.

In accordance with my invention, that portion of each end of the handle bar 1, which is usually of circular section, is formed with a series of projecting barbs or tongues 3 which may be struck up by means of a chisel, although obviously the method of their formation is immaterial. It is characteristic of these barbs or teeth that each of them lies at an angle to the general line of the handle bar 1 so that when the hollow hand hold or grip 2 is forcibly driven on or pressed over the end of said bar, it cannot be either withdrawn or rotated without destruction;—the barbs or teeth being so sloped and pointed as to permit of the forcible introduction of the end of the handle bar into the previously formed cylindrical cavity of the more or less yielding hand hold, although as above noted opposing the withdrawal or movement of said bar.

It has been noted that a person riding a vehicle such as a bicycle or velocipede has a tendency to twist and ultimately loosen the grips or hand holds, and I have found that by the above simple and inexpensively applied construction such rotation and loosening is effectually prevented.

I claim:—

1. The combination of a handle bar; with a grip having an elongated cavity for the reception of the end of said handle bar, the latter being formed with a series of projecting barbs formed to prevent removal and rotation of said grip after it has been forcibly placed thereon.

2. The combination of a handle bar; and a grip having an elongated cavity for the reception of one end of said handle bar, the latter being formed with a series of projecting barbs shaped to prevent rotation of said grip on said handle bar after it has been forcibly mounted thereon.

3. The combination of a bar having a series of projecting barbs inclined to its center line; with a grip forcibly applied to the bar and prevented by said barbs from longitudinal and rotary movement.

4. A handle bar having each of its ends provided with struck up inclined teeth; a grip of yieldable material for each end of said handle bar held from rotation and longitudinal movement by said teeth.

NIKOLAUS GERSON.